May 31, 1938. H. L. FLETCHER 2,119,429
PROTECTIVE BEADING FOR MOTOR CAR FENDERS
Filed May 8, 1937

Inventor.
Hardy L. Fletcher.
by
atty.

Patented May 31, 1938

2,119,429

UNITED STATES PATENT OFFICE 2,119,429

PROTECTIVE BEADING FOR MOTOR CAR FENDERS

Hardy L. Fletcher, Toronto, Ontario, Canada

Application May 8, 1937, Serial No. 141,399

5 Claims. (Cl. 280—152)

The principal object of this invention is to obviate damage to the edge portions of motor car fenders in coming into scraping contact with other objects and to provide a means for this purpose which will be neat and attractive in appearance and which may be economically applied without objectionable increase in the manufacturing costs.

The principal feature of the invention resides in the provision of a protective strip of flexible material and in the marginal grooving or channeling of the fenders to accommodate the protective strip in a partially recessed manner, leaving a portion of the strip projecting beyond the adjacent surface of the fender for scuffing contact with objects that would otherwise injure the edge portions of the fenders or the finish thereon.

In the drawing, Figure 1 is a perspective view of a motor car illustrating the present invention applied thereto.

In the conventional form of fender which is of deeply crowned form, there is exposed a considerable surface area at the sides which is quite exposed and unprotected against unsightly marring and scuffing upon the slightest scrubbing contact with adjacent objects, such as a wall, post or the fenders of an adjacent motor car and the present invention provides a very simple and inexpensive means for eliminating this possibility of damage, while at the same time preserving the essential conventional form of the fender.

Previous attempts have been made to render fenders substantially immune to damage when subjected to crushing impact, but such attempts, so far as I am aware, involved a special composite construction of the entire guard so that the guard or fender itself could be distorted and would spring back to shape and in this connection the edge portions of the guard material was rolled into substantially rigid beaded form. Such constructions were not only prohibitively costly to manufacture, but were of a more or less unsightly nature and unduly heavy, whereas the present invention is concerned only with the special edge construction of and means for protecting the fender against incidental damage.

Figure 1:
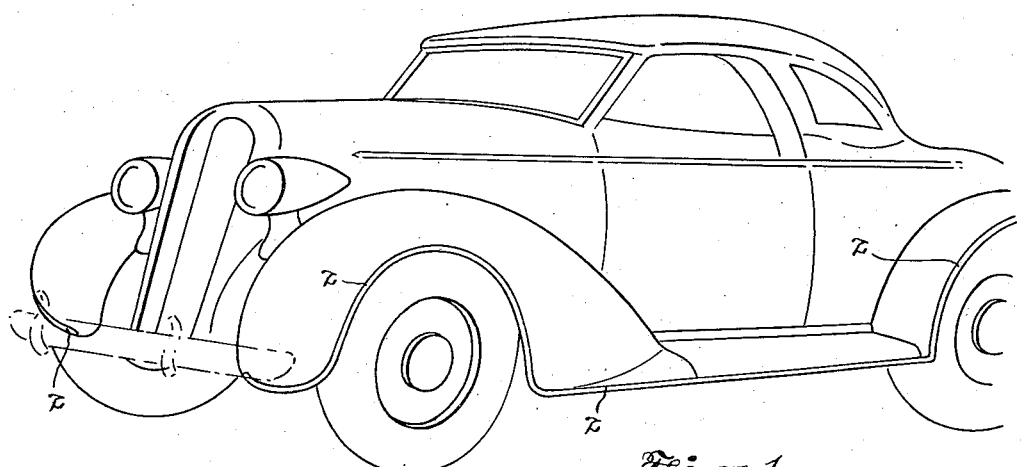
Figure 2:
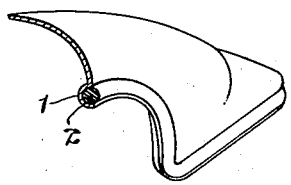
Figure 2 is a sectional perspective view of a fender illustrating one preferred form of protecting strip and the manner of attaching same.
Figure 4:
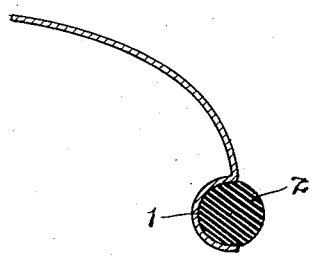
Figure 4 is a fragmentary cross section of the edge portions of the fender shown in Figure 2 on an enlarged scale.

Referring to the illustrated form of the invention, the fender illustrated in Figures 2 and 4 is shown as having the edge portion marginally grooved or channeled at 1, which channel is shown as of substantially semi-circular cross section and into this groove or channel is pressed a strip of flexible material 2 of any suitable material or form and here shown of circular cross section so that it fits snugly within the channel and the inner periphery of the channel preferably represents slightly more than a half circle so that when the resilient strip is pressed into place it will be effectively interlocked with the wall of the channel without requiring to be cemented into place, but if desired a suitable adhesive may be employed which will form a seal between the strip and channel wall, preventing moisture from lodging therebetween.

Figure 3:
Figure 3 is a sectional perspective view of a fender illustrating a modified form of protective strip and manner of attaching same.
Figure 5:
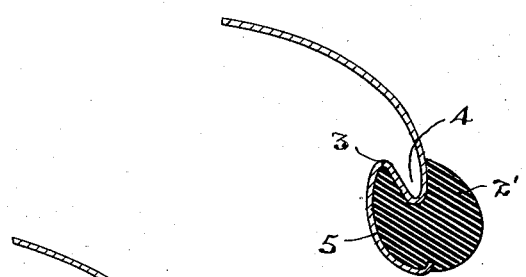
Figure 5 is a fragmentary transverse section of the edge portion of the fender shown in Figure 3 on an enlarged scale.

In the modified form of the invention shown in Figures 3 and 5, the edge portion of the guard is shown as swedged inwardly and upwardly to a substantial apex 3, forming a water course 4 on the inward side of the fender and the edge extremity of the guard is turned downwardly, outwardly and upwardly from the apex 3, forming a groove or channel 5 which opens outwardly and is of inwardly diverging form. The protective strip 2' is, in this instance, of a special cross sectional shape having a portion to fit snugly under tension within the specially-shaped channel 5, while the outer exposed portion embraces the edge portions of the channel on the outward side of the fender and projects as a protective bead.

Figure 6:
Figure 6 is an enlarged transverse fragmentary sectional view illustrating a further modified form of the invention.

In the form shown in Figure 6 the edge portion of the fender is turned upwardly forming a water groove 4' and the protective flexible strip 2'' is of a special moulded cross section having a longitudinal inner lip 6 adapted to snugly hook over and grip the inturned edge of the guard and the protective element extends under the edge portion of the guard and upwardly on the outward edge portion and it may be of sufficient inherent strength and resiliency to remain in its place by its interlocking relation to the edge of the guard, or as indicated in connection with the strip shown in Figures 2 and 4, the strip 2'', or the strip 2' of Figures 3 and 5 may, if desired, have a suitable adhesive applied thereto where it contacts with the guard surface which will more permanently unite the two elements and form an effective water-seal therebetween.

In each case the protective strip may be formed very economically of an extruded strip of rubber having the required characteristics, preferably a rubber having the desired flexibility, while at the same time being capable of sliding contact against surfaces with which it may come in rubbing contact so that too much friction will not be generated between the strip and such object which would impose an undesired "drag" on the strip tending to dislodge the same.

In certain cases I may insert a strip of material other than rubber such as fibre and in any case the inserted strip may be either of a neutral colour or of a colour to harmonize or contrast with the colour of finish on the fenders.

What I claim as my invention is:—

1. A protective beading for the marginal edge of a standard fender of the type having the marginal outer side portion thereof turned divergently inward and upward to form a substantially V-shaped water course, comprising a flexible moulded strip pre-formed to snugly embrace the outer marginal portion of the fender and the inner and outer surface of the upwardly turned portion of the V-shaped water course free of obstruction of the water course.

2. A protective beading for the marginal edge of a standard fender of the type having the marginal outer side portion thereof turned divergently inward and upward to form a substantially V-shaped water course, comprising a strip of flexible material having a V-shaped channel therein leaving a substantial portion embracing the outer side of the fender in the region and a portion to embrace the upturned portion of the channel flange, said latter portion being of greater width than the width of the upturned portion of the channel and preformed to receive and embrace the edge thereof in an interlocked connection without obstructing the water course.

3. A protective beading for the marginal outer side edge of a standard fender having the marginal portion flanged divergently inward and upward to form a water channel of substantial V-shaped cross section, comprising a strip of flexible material of substantial C-shaped cross section having a V-shaped channel to snugly receive the V-shaped channel portion of the fender and having a free tapering portion to embrace the outer side of the guard in the channel region with only slight projection therebeyond, and a portion embracing the inner channel flange and extending therebeyond and provided with an extremity which is hooked inwardly and downwardly into the V-shaped channel of the strip to overhand and interlockingly engage the edge extremity of the upwardly turned portion of the V-shaped water channel in non-obstructing relation to the water channel.

4. A protective beading for the marginal edge of a standard fender of the type having the marginal outer side portion thereof turned divergently inward and upward to form a substantially V-shaped water course, comprising a moulded rope-like strip of rubber longitudinally channelled with one wall of the channel inwardly and downwardly hooked to embrace the water course channel wall in interlocked relation and extend under the channelled edge of the fender and overlapping the outward side thereof in a thin protective bead, said hooked portion forming a watershed to completely overlie the actual edge extremity of the inturned channel portion of the fender to minimize entry of water between the fender flange and embracing portion of the strip.

5. A protective beading for the outer marginal edge of a fender of the type flanged to form a water channel presenting a free edge extremity, comprising a flexible resilient strip of rubber formed to embracingly interlock with the flanged marginal portions of the fender and being longitudinally grooved to receive the actual terminal edge extremity of the flange formation in an embedded watershed sealing manner.

HARDY L. FLETCHER.